Patented Nov. 6, 1934

1,979,586

UNITED STATES PATENT OFFICE 1,979,586

WAX-LIKE SUBSTANCES AND METHOD OF PREPARING SAME

Donald K. Tressler, Pittsburgh, Pa., assignor to The Mathieson Alkali Works, Inc., New York, N. Y., a corporation of Virginia No Drawing. Application September 11, 1929, Serial No. 391,983

22 Claims. (Cl. 260—134)

This invention relates to new wax-like substances, and includes both the new products and the method of producing them.

The new wax-like products of the present invention are hydrogenated higher ketones produced by the hydrogenation of the higher unsaturated ketones such as oleone, etc.

The ketones produced from the higher unsaturated fatty acids and from mixtures of unsaturated and saturated fatty acids are for the most part relatively soft, low-melting products of limited usefulness.

According to the present invention, such higher unsaturated ketones, produced from unsaturated fatty acids, or mixtures of ketones produced from mixtures of saturated and unsaturated fatty acids, are converted into new and valuable wax-like products, namely, hydrogenated ketones, which differ in their properties from the higher saturated ketones possessing the same number of carbon atoms. The conversion of the unsaturated ketones into hydrogenated ketones is effected by treatment of the ketones in a purified state with hydrogen in the presence of a catalyst at an elevated temperature to effect hydrogenation of the unsaturated ketones to an extent sufficient to convert them into new and valuable wax-like products.

The ketones which are employed for producing the new hydrogenated ketones are those derived from unsaturated higher fatty acids, such as oleic acid, linolic acid, etc., or from mixtures of unsaturated fatty acids, or from mixtures of saturated and unsaturated fatty acids, such as are obtained by the saponification of animal or vegetable oils or fats. The unsaturated fatty acids, or mixtures of unsaturated and saturated fatty acids, can readily be converted into ketones of high purity and with high yield, by heating to a high temperature, around 300° C. or higher, in the presence of a small amount of a suitable catalyst, such as finely divided iron or iron oxide, etc., and under non-oxidizing conditions, i. e., with avoidance of the presence of air during the process, as set forth in my application, Serial No. 556,322, filed August 10, 1931. Non-oxidizing conditions can, for example, be obtained by passing a current of inert gas through the reaction vessel to sweep out the air before the reaction mixture is heated to a high temperature, and by continuing the passage of inert gas through the apparatus during the process to insure that air will be excluded. Oleic acid, for example, can be heated with five to ten per cent of finely divided oxide of iron and an inert gas bubbled through the apparatus and the reaction mixture, to keep out the air. From commercial oleic acid, a high yield of crude oleone can be thus prepared. Mixed ketones can be prepared by heating two or more unsaturated fatty acids with iron or iron oxide in the absence of air, or by heating a mixture of saturated and unsaturated fatty acids in a similar manner, as set forth in my application above referred to.

The unsaturated higher ketones, obtainable as above described, or by other processes of manufacture, are subjected to hydrogenation, and the hydrogenation is carried to the extent of producing new and valuable wax-like products. The crude unsaturated ketone, oleone, obtainable from commercial refined red oil, when hydrogenated to an extent such that the product has an iodine value varying from about 25 to 60 and a melting point between about 79° and 63° C., yields a tough, wax-like product resembling beeswax in many of its physical properties. The new hydrogenated ketones differ in their properties from the saturated ketone, stearone, prepared by heating stearic acid with iron, stearone being a very hard, crystalline wax-like product melting at about 89° C.

While I do not desire to limit myself by any theoretical explanation of the course of the hydrogenation of the unsaturated ketones, the results obtained by the hydrogenation of oleone indicate that the unsaturated ketones can be readily hydrogenated to a certain extent, but resist further and complete hydrogenation, giving stable intermediate ketones, intermediate in degree of hydrogenation between the unsaturated ketones and the fully saturated ketones.

The hydrogenation of the unsaturated ketones can be carried out with different catalysts. Platinum, while effective in a finely divided state, is not commercially available because of its cost. In attempting to employ a reduced nickel catalyst, I have found that the crude unsaturated ketones resist hydrogenation, and that it is important to subject the ketones to a special treatment in order to enable them to be readily hydrogenated with reduced nickel catalysts. When suitably treated, the ketones can, however, be readily hydrogenated with reduced nickel catalysts, or with nickel supplemented by thorium or by osmium, or some other rare metal. The finely reduced nickel is advantageously supported on a suitable support, such as finely divided infusorial earth.

The hydrogenation of the ketones with a reduced nickel catalyst, or with mixtures of nickel and other catalysts, is carried on at a high temperature, somewhere around 300 to 350° C., depending somewhat upon the particular catalyst employed. At temperatures below 300° C. the absorption is lower, while at temperatures above 350° C., there is danger of decomposition of the ketones.

I have found that the unsaturated higher fatty ketones which resist hydrogenation in the presence of reduced nickel catalysts at a high temperature, can be easily hydrogenated if they are subjected to purification by heating to a temperature around 130° C., with freshly precipitated cupric hydrate or with freshly precipitated nickelous hydrate. A solution of potassium hydroxide has a similar purifying effect, but is not as effective. I have found, for example, that when crude oleone is heated at 130° C., with freshly precipitated cupric hydrate (prepared by the addition of ammonia to a copper acetate solution) and then washed with a 10% potassium hydroxide solution, the oleone can be easily hydrogenated to produce a product of iodine value of about 50, which is hard and slightly greasy. Upon crystallization from isopropyl alcohol, a somewhat tough wax, resembling beeswax in many of its properties, is obtained, having an iodine value of about 28 and a melting point of 77–78°. Crude oleone treated with freshly precipitated cupric hydrate, without subsequent washing with an alkaline solution, can also be hydrogenated satisfactorily. Crude oleone treated with a 10% solution of potassium hydroxide without first treating the ketone with cupric hydrate, can also be partially hydrogenated. Crude oleone treated at 130° with freshly precipitated nickelous hydrate can also be easily hydrogenated.

The resistance to hydrogenation of the unsaturated ketones is very likely due to sulfur compounds contained in them, since commercial oleic acid, for example, is produced by processes in which sulfuric acid is employed at successive stages of its manufacture, first, in washing the hot grease before hydrolysis, then during hydrolysis, and later as a part of the bleaching treatment to effect removal of the iron. Whatever the cause of resistance to hydrogenation may be, and whether or not it is due to sulfur impurities or constituents resulting from treatment with sulfuric acid, I have found that this resistance can be effectively overcome and the ketones readily hydrogenated if they are subjected to a preliminary treatment, such as that above described, e. g., by treatment with cupric hydrate or nickelous hydrate, at temperatures varying from about 110° to about 200° C.

Upon the completion of the hydrogenation, the hydrogenated ketones are separated from the catalyst, by permitting the catalyst to settle from the hot liquid ketones or by passing the ketones through a suitable filter press. The crude hydrogenated ketones can be further purified by crystallization from suitable solvents, such as isopropyl alcohol, etc.

The new wax-like products produced by the hydrogenation of the unsaturated ketones will vary somewhat with the particular unsaturated ketone hydrogenated, or the mixture of ketones, or the mixed ketones, hydrogenated. The character of the product can also be regulated to some extent by regulating the degree of the hydrogenation.

The new wax-like products produced by hydrogenating unsaturated fatty ketones are suitable for many commercial purposes. They make excellent substitutes for beeswax for certain purposes. They can be made so that they have physical properties the same as or similar to beeswax, but with a higher melting point. They may be employed in wax compositions by mixing with waxes of lower melting points, to produce waxes of higher melting points. The new wax-like products are neutral, stable and unsaponifiable and may be used for purposes where natural waxes having acidic properties cannot satisfactorily be employed.

The invention will be further illustrated by the following specific example. The parts are by weight.

1000 parts of crude oleone, prepared from 1250 parts of double distilled red-oil in the manner above referred to, were heated for a period of about one hour at a temperature of about 130° C., with 75 parts of freshly precipitated copper hydrate (prepared by treating a solution of one gram molecule of cupric acetate with two molecules of ammonium hydroxide, and then separating the precipitate by filtration, washing the precipitate, pressing to remove as much as possible of the water, and then adding the copper hydrate to the hot oleone). After heating the oleone with the copper hydrate, the latter was removed by filtration, and the treated oleone placed in a hydrogenation vessel equipped with an agitator, and there was added 35 parts of a nickel-thorium catalyst (prepared as described below). Hydrogen was introduced under a pressure of 80 pounds per square inch, and the mixture of oleone and catalyst was agitated and heated to a temperature of 325° C., and maintained at that temperature until the iodine value of the ketone had been reduced from about 100 to about 51, and the melting point raised from 40° C. to about 56° C. At the end of the hydrogenation, the catalyst was separated from the hydrogenated ketone by filtration, and the hydrogenated ketone cooled. The product was somewhat greasy, but on crystallization from a suitable solvent such as isopropyl alcohol or ethyl acetate, a crystallized hydrogenated ketone was obtained as a rather hard, tough wax, melting at about 77–78° C.

The nickel-thorium catalyst employed in the above example was made by treating 40 parts of infusorial earth with a solution of 60 parts of nickelous nitrate crystals, and 2.5 of thorium nitrate crystals, then adding 28 parts of ammonium hydroxide of 0.90 specific gravity, 2 parts at a time with slow mixing of each portion, after which the suspension was evaporated to a thick paste, and then heated for about one hour at 350° C. The catalyst was cooled, ground and reignited at 350° C. for fifteen minutes.

The process of the above specific example can be varied, for example, by using other catalysts, such as a finely divided reduced nickel catalyst, or by preliminarily treating the crude ketone with especially precipitated nickelous hydrate instead of cupric hydrate, or by carrying out the hydrogenation under conditions to effect a somewhat greater or less degree of hydrogenation and the production of a wax-like product of varying degrees of hardness and saturation. The temperature and the pressure of hydrogen can also be somewhat varied.

Instead of hydrogenating crude oleone, the unsaturated ketones from other unsaturated fatty acids, such as the ketones from linolic acid, or mixed ketones made from oleic and linolic acid, or from mixtures of unsaturated fatty acids produced by the saponification of animal or vegetable oils, or mixtures of ketones produced from mixed unsaturated and saturated fatty acids, can be treated in a similar manner to that described in the above specific example, to produce new and valuable wax-like products.

I claim:

1. The method of producing unsaturated wax-like products which comprises subjecting higher unsaturated fatty ketones to hydrogenation to effect partial saturation of said ketones until the wax-like products are produced.

2. The method of producing an unsaturated wax-like product, which comprises subjecting a mixture of unsaturated higher fatty ketones to hydrogenation to effect partial saturation of said ketones until the wax-like product is produced.

3. The method of producing an unsaturated wax-like product, which comprises subjecting mixed unsaturated and saturated ketones (produced from mixed higher unsaturated and saturated fatty acids) to hydrogenation to effect partial saturation of said ketones until the wax-like product is produced.

4. The method of producing unsaturated wax-like products, which comprises subjecting unsaturated ketones derivable from unsaturated fatty acids of natural fats to a preliminary treatment to remove therefrom constituents which interfere with hydrogenation with a nickel catalyst, and subjecting the resulting purified ketones to hydrogenation at an elevated temperature not above 350° C. in the presence of a nickel catalyst.

5. The method of producing unsaturated wax-like products, which comprises subjecting unsaturated higher fatty ketones derivable from fatty acids of natural fats, which ketones have been purified from constituents interfering with hydrogenation with a nickel catalyst, to hydrogenation with a nickel catalyst at a temperature around 300° to 350° C.

6. Unsaturated tough wax-like products comprising essentially hydrogenated unsaturated higher fatty ketones.

7. Unsaturated tough wax-like products comprising essentially hydrogenated mixtures of unsaturated higher fatty ketones.

8. Unsaturated tough wax-like products comprising essentially hydrogenated mixtures of higher unsaturated and saturated fatty ketones.

9. Unsaturated tough wax-like products comprising essentially hydrogenated unsaturated fatty ketones having an iodine value between 25 and 60.

10. Unsaturated tough wax-like products comprising essentially hydrogenated unsaturated higher fatty ketones having a melting point between 63 and 79° C.

11. Unsaturated tough wax-like products comprising essentially hydrogenated unsaturated higher fatty ketones, said new wax-like products having physical properties similar to those of beeswax.

12. Unsaturated higher fatty ketones resembling beeswax but with a melting point to about 63° to 79° C., said ketones being neutral, stable and unsaponifiable.

13. An unsaturated fatty ketone the formula of which contains the same number of carbon atoms as oleone but a larger number of hydrogen atoms.

14. The method of producing unsaturated wax-like products, which comprises subjecting unsaturated higher fatty ketones to hydrogenation at an elevated temperature not above 350° C. using hydrogen under pressure and continuing the hydrogenation until the wax-like products are produced.

15. The method of producing unsaturated wax-like products, which comprises subjecting oleone at a temperature between 300 and 350° C. to the action of hydrogen in the presence of a metallic catalyst to effect partial saturation of the oleone and continuing the reaction until the desired wax-like product is produced.

16. Unsaturated tough wax-like products comprising essentially hydrogenated mixed fatty ketones containing both an unsaturated and a saturated higher aliphatic radical.

17. Unsaturated tough wax-like products comprising essentially hydrogenated unsaturated fatty ketones having a melting point between 63° and 79° C. and an iodine value between 25 and 60.

18. A wax-like product derived from oleic acid and comprising essentially hydrogenated unsaturated fatty ketones, said product having a melting point between 63° and 79° C. and an iodine value between 25 and 60.

19. A method of saturating unsaturated aliphatic radicals as they occur in combination with a ketone group of a ketone derivable from fatty acids of natural fats which comprises subjecting them to the action of hydrogen under pressure at an elevated temperature not above 350° C. in the presence of a metallic catalyst to effect incomplete saturation and the production of an unsaturated wax-like product.

20. The method of producing unsaturated wax-like products which comprises subjecting unsaturated higher fatty ketones derivable from fatty acids of natural fats, which ketones have been purified from constituents interfering with hydrogenatiton with a nickel catalyst, to hydrogenation with a nickel-rare-earth-metal catalyst at a temperature around 300° to 350° C. to effect incomplete saturation and the production of an unsaturated wax-like product.

21. The method of treating unsaturated wax-like ketones obtained by the ketonization of unsaturated fatty acids obtained by the saponification of an ester from the group consisting of the animal and vegetable oils and fats which comprises purifying the ketone by heating with a base from the group consisting of potassium hydroxide and copper and nickel hydrates and then hydrogenating in the presence of a catalyst containing nickel to obtain a more saturated ketone.

22. The method of treating oleone obtained by the ketonization of red oil which comprises purifying the oleone by heating with freshly precipitated cupric hydrate at a temperature between about 110° and about 200° C. and then hydrogenating in the presence of a catalyst containing nickel to obtain a more saturated but incompletely saturated wax-like ketone.

DONALD K. TRESSLER.